United States Patent
Garbossa et al.

(10) Patent No.: US 11,804,775 B2
(45) Date of Patent: Oct. 31, 2023

(54) POWER DELIVERY TO A DRIVER CIRCUIT IN A POSTREGULATOR

(71) Applicant: Infineon Technologies AG, Neubiberg (DE)

(72) Inventors: Cristian Garbossa, Bressanone (IT); Alberto Arpino, San Mauro Pascoli (IT); Michele Bergo, Padua (IT); Dario Cappuzzo, Limena (IT); Bogdan Dimitriu, Bucharest (RO); Vlad Alexandru Mircea Ionescu, Bucharest (RO); Paola Lops, Albignasego (IT); Luca Scandola, Villafranca di Verona (IT); Ozan Serpedin, Constanta (RO); Silvia Solda, Padua (IT)

(73) Assignee: Infineon Technologies AG, Neubiberg (DE)

( * ) Notice: Subject to any disclaimer, the term of this patent is extended or adjusted under 35 U.S.C. 154(b) by 371 days.

(21) Appl. No.: 17/241,556

(22) Filed: Apr. 27, 2021

(65) Prior Publication Data
US 2022/0345039 A1      Oct. 27, 2022

(51) Int. Cl.
| H02M 3/158 | (2006.01) |
| H02M 1/36 | (2007.01) |
| H02M 1/08 | (2006.01) |

(52) U.S. Cl.
CPC ............. *H02M 3/158* (2013.01); *H02M 1/08* (2013.01); *H02M 1/36* (2013.01)

(58) Field of Classification Search
CPC .......... H02M 3/158; H02M 1/08; H02M 1/36; H02M 1/0006
See application file for complete search history.

(56) References Cited

U.S. PATENT DOCUMENTS

| 2009/0059630 A1* | 3/2009 | Williams | ............ H02M 3/1588 363/60 |
| 2015/0053660 A1* | 2/2015 | Schartner | ............. B23K 9/1062 219/130.1 |

OTHER PUBLICATIONS

NXP "VR5500 High voltage PMIC with multiple SMPS and LDO," Preliminary Data Sheet, Rev. 3, May 22, 2019, 130 pp.
Grigore et al., "Dynamics of a Buck Converter with a Constant Power Load," 29th Annual IEEE Power Electronics Specialist Conference, May 22, 1998, IEEE, 7 pp.
Infineon Technolgies AG, "Optireg™ PMIC TLF35584," Rev 1.0, Mar. 25, 2019, IFX-jmv1546509847065, 7 pp.

(Continued)

*Primary Examiner* — Adolf D Berhane
*Assistant Examiner* — Afework S Demisse
(74) *Attorney, Agent, or Firm* — Shumaker & Sieffert, P.A.

(57) ABSTRACT

In some examples, a device includes a selector circuit configured to deliver power to a first driver circuit, where the first driver circuit is configured to activate and deactivate a first switch of a postregulator. The device also includes a startup regulator and a controller configured to cause the selector circuit to deliver power from the startup regulator to the first driver circuit. The controller is also configured to determine that a boost regulator is operational after delivering power from the startup regulator to the first driver circuit. The controller is further configured to cause the selector circuit to deliver power from the boost regulator to the first driver circuit in response to determining that the boost regulator is operational.

20 Claims, 8 Drawing Sheets

(56) References Cited

OTHER PUBLICATIONS

Dragoi, "Optimizing the front-end power solution for automotive ADAS systems," Advances in Science, Technology and Engineering Systems Journal vol. 2, No. 3, Aug. 24, 2017, 8 pp.

Cespedes et al., "Constant-Power Load System Stabilization by Passive Damping," IEEE Transactions on Power Electronics, vol. 26, No. 7, Jul. 2011, 5 pp.

Khaligh et al., "Realization of Parasitics in Stability of DC-DC Converters Loaded by Constant Power Loads in Advanced Multiconverter Automotive Systems," IEEE Transactions on Industrial Electronics, vol. 55, No. 6, Jun. 2008, 11 pp.

U.S. Appl. No. 17/241,617, filed Apr. 27, 2021, naming inventors Arpino et al.

U.S. Appl. No. 17/241,669, filed Apr. 27, 2021, naming inventors Scandola et al.

\* cited by examiner

POWER DELIVERY TO A DRIVER CIRCUIT IN A POSTREGULATOR

TECHNICAL FIELD

This disclosure relates to power electronics.

BACKGROUND

A cold crank condition can occur during low temperatures when an automotive battery cannot supply the acceptable voltage magnitude. A boost regulator may be used in the automotive system to product a sufficient voltage even when the battery voltage falls below an acceptable voltage magnitude. The boost regulator may be configured to deliver power to all of the downstream regulators and loads, which can ensure that the entire system receives an acceptable voltage magnitude.

SUMMARY

This disclosure describes techniques for delivering power to a postregulator using a startup regulator and a boost regulator. A controller may be configured to cause a selector circuit to deliver power from the startup regulator to a driver circuit of the postregulator. The controller may be configured to also cause the selector circuit to deliver power from the boost regulator to the driver circuit of the postregulator in response to determining that the boost regulator is operational.

The techniques of this disclosure may allow for a less expensive boost regulator because the boost regulator supplies fewer than all of the downstream regulators and loads. In addition, the techniques may allow for lower on-resistance for the switches that are driven based on power received from the boost regulator.

In some examples, a device includes a selector circuit configured to deliver power to a first driver circuit, where the first driver circuit is configured to activate and deactivate a first switch of a postregulator. The device also includes a startup regulator and a controller configured to cause the selector circuit to deliver power from the startup regulator to the first driver circuit. The controller is also configured to determine that a boost regulator is operational after delivering power from the startup regulator to the first driver circuit. The controller is further configured to cause the selector circuit to deliver power from the boost regulator to the first driver circuit in response to determining that the boost regulator is operational.

In some examples, a method includes causing a selector circuit to deliver power from a startup regulator to a first driver circuit, wherein the first driver circuit is configured to activate and deactivate a first switch of a postregulator. The method also includes determining that a boost regulator is operational after delivering power from the startup regulator to the first driver circuit. The method further includes causing the selector circuit to deliver power from the boost regulator to the first driver circuit in response to determining that the boost regulator is operational.

In some examples, a system includes a boost regulator and a postregulator including a first switch configured to deliver power to a load and a first driver circuit configured to activate and deactivate the first switch. The system also includes a selector circuit configured to deliver power to the first driver circuit and a controller configured to cause the selector circuit to deliver power from a startup regulator to the first driver circuit. The controller is also configured to determine that the boost regulator is operational after delivering power from the startup regulator to the first driver circuit. The controller is further configured to cause the selector circuit to deliver power from the boost regulator to the first driver circuit in response to determining that the boost regulator is operational.

The details of one or more examples are set forth in the accompanying drawings and the description below. Other features, objects, and advantages will be apparent from the description and drawings, and from the claims.

DETAILED DESCRIPTION

This disclosure describes devices, methods, and techniques for delivering power to the driver circuit of a postregulator. Before a boost regulator is operational in a system (e.g., during startup), the driver circuit of the postregulator may receive power from a startup regulator that is powered by a battery or other power source. Once the boost regulator becomes operational, a selector circuit may be configured to cease delivering power from the startup regulator to the postregulator driver circuit and begin delivering power from the boost regulator to the postregulator driver circuit.

The techniques of this disclosure may be useful in battery-powered applications for efficiently distributing power to loads during startup operation. For example, in an automotive system, it may be important to sustain the supply voltage at or above three volts during cold crank condition while maintaining efficiency. The efficiency of the system may be based on the magnitude of the supply voltage, such that an increase of just a few hundred millivolts may improve efficiency. Thus, a controller of this disclosure may be configured to cause a startup regulator to deliver power to a driver circuit until a boost regulator is operational, and this approach may improve the efficiency of the system.

One possible first type of architecture for an electrical system includes a boost regulator at the beginning of the converter chain. A potential advantage of this first architecture is that all loads are protected during cold crank event. A second type of architecture includes a preregulator at the beginning of the converter chain with a boost regulator after the preregulator. The boost regulator may be configured to supply the higher-voltage regulators and loads, rather than supplying all of the regulators. A potential advantage of this second architecture is lower bill of materials costs, as compared to a boost on top architecture, because of less expensive high-voltage capacitors. In addition, in the second architecture, the boost regulator may be less expensive because of the lower current requirement.

In a system of this disclosure, the boost regulator may be configured to supply a plurality of postregulators, such as DC/DC converters and/or low-dropout regulators (LDOs). This system may support cold cranking operation and may improve the efficiency of the system, especially for a postregulator supplied at a relative voltage from the boost regulator. The boost regulator may be configured to directly supply the postregulators to potentially mitigate power loss in the low-side switches of the postregulators. The driver circuit(s) of the one or more postregulators may not be affected by movement of the preregulator supply voltage during cold crank operation.

Figure 1:
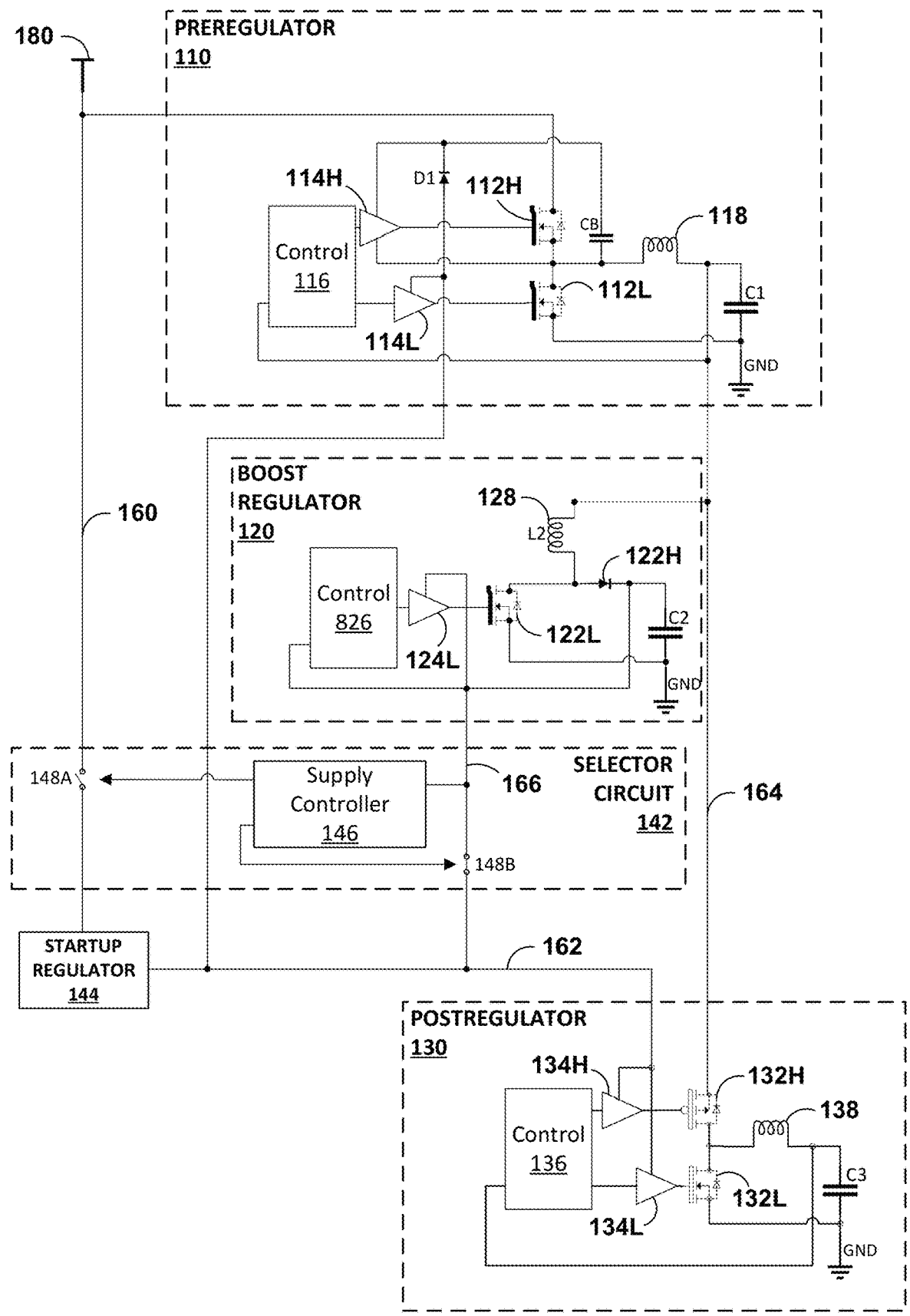
FIG. 1 is a circuit diagram of an example system comprising a preregulator, a boost regulator, a selector circuit, and a postregulator, in accordance with the techniques of this disclosure.

FIG. 1 is a circuit diagram of an example system comprising a preregulator 110, a boost regulator 120, a selector circuit 142, and a postregulator 130, in accordance with the techniques of this disclosure. As shown in the example of FIG. 1, preregulator 110 includes high-side switch 112H, low-side switch 112L, driver circuit 114H, driver circuit 114L, controller 116, and inductor 118. Preregulation 110 may be configured to generate a stable output voltage for intermediate rail 164 to boost regulator 120 is connected. Although preregulator 110 is depicted in FIG. 1 as a buck converter with a half-bridge circuit, other configurations are possible for preregulator 110. For example, low-side switch 112L can be replaced by a diode configured to conduct electricity when high-side switch 112H is deactivated.

Driver circuit 114H is configured to activate and deactivate high-side switch 112H based on signals received from controller 116. Driver circuit 114L is configured to activate and deactivate low-side switch 112L based on signals received from controller 116. High-side switch 112H may be configured to receive power from power source 180 and deliver power to boost regulator 120 and postregulator 130 via rail 164 through inductor 118. Driver circuits 114H and/or 114L may be configured to receive power from selector circuit 142 via rail 162.

Boost regulator 120 includes high-side switch 122H, low-side switch 122L, driver circuit 124L, controller 126, and inductor 128. Although preregulator 120 is depicted in FIG. 1 as including a single switch 122L and diode 122H, other configurations are possible for boost regulator 120, such as a half-bridge circuit including two switches.

Driver circuit 124L is configured to activate and deactivate high-side switch 122L based on signals received from controller 126. Inductor 128 may be configured to receive power from preregulator 110 via rail 164 and deliver power to selector circuit 142 and driver circuit 124L via rail 166. Driver circuit 124L may be configured to receive power from the output of boost regulator 120 (e.g., the output of diode 122H).

Postregulator 130 includes high-side switch 132H, low-side switch 132L, driver circuit 134H, driver circuit 134L, controller 136, and inductor 138. Although postregulator 130 is depicted in FIG. 1 as a buck converter with a half-bridge circuit, other configurations are possible for preregulator 130. For example, low-side switch 132L can be replaced by a diode configured to conduct electricity when high-side switch 132H is deactivated.

Driver circuit 134H is configured to activate and deactivate high-side switch 132H based on signals received from controller 136. Driver circuit 134L is configured to activate and deactivate low-side switch 132L based on signals received from controller 136. High-side switch 132H may be configured to receive power from selector circuit 142 and/or startup regulator 144 and deliver power to a load (not shown in FIG. 1) through inductor 138. Driver circuits 134H and/or 134L may be configured to receive power from selector circuit 142 via rail 162.

Startup regulator 144 may be configured to operate during a startup routine of the system shown in FIG. 1. For example, startup regulator 144 may be configured to generate a sufficient voltage for driver circuits 114H and/or 134H when controller 146 activates switch 148A during the startup routine. Supply controller 146 may be configured to deactivate switch 148A when the output voltage generated by boost regulator 120 is high enough and activate switch 148B to cause boost regulator 120 to supply power to driver circuits 114H and/or 134H. When activated, switch 148B may operate as a bypass switch, allowing power to pass from boost regulator 120 to driver circuits 134H and 134L.

Supply controller 146 may include a comparator configured to compare the voltage level of the outputs of boost regulator 120 and startup regulator 144. In response to determining that the voltage level of the output of boost regulator 120 is greater than or equal to the voltage level of the output of startup regulator 144, supply controller 146 may be configured to deactivate switch 148A and activate switch 148B. Each of switches 148A and/or 148B may include back-to-back switches or a single switch with a biased backside diode. FIG. 1 depicts supply controller 146 as sensing the voltage on rail 166, but controller 146 may also be configured to sense the voltage on rail 162 in some examples.

Figure 7:
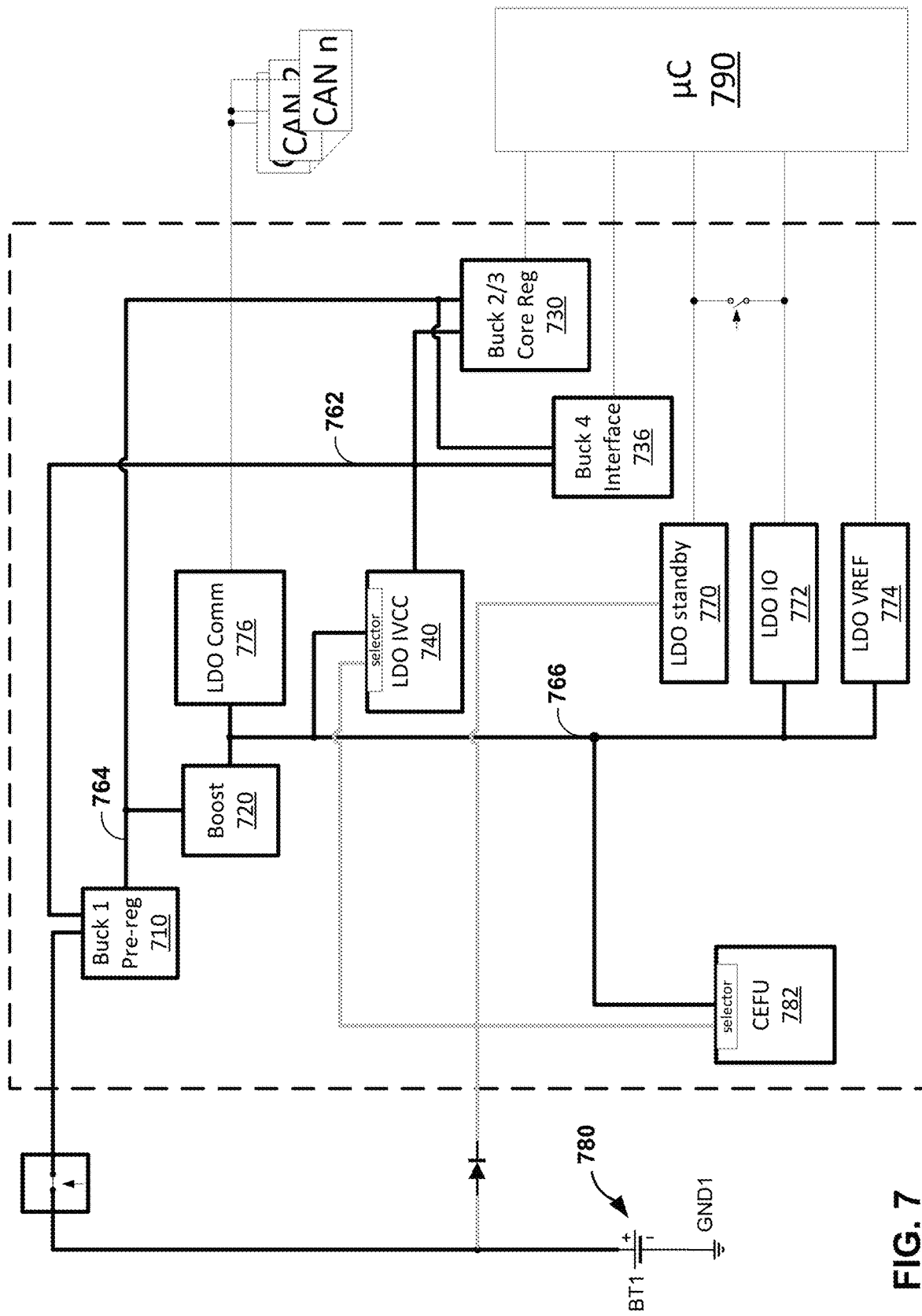

Although only one instance of postregulator 130 is shown in FIG. 1 for simplicity, in some examples, the system may include more than one postregulator that receives the outputs generated by preregulator 110 and/or boost regulator 120. For example, postregulators 730 and 736 shown in FIG. 7 are examples of multiple regulators that can receive power from a preregulator and a boost regulator.

In the example shown in FIG. 1, switches 114H, 114L, 122L, and 132L include N-type metal-oxide-semiconductor (MOS) transistors, and switch 132H includes a P-type MOS transistor. However, other types of transistors can be used, such as any type of field-effect transistor (FET), a bipolar junction transistor (BJT), an insulated-gate bipolar transistor (IGBT), a high-electron-mobility transistor (HEMT), and/or another element that uses voltage and/or current for its control. In some examples, one or more of switches 114H, 114L, 122L, 132H, and 132L may include back-to-back transistors in a series or anti-series arrangement. In an anti-series arrangement, the source terminals or the drain terminals of the back-to-back transistors may be connected to each other to prevent reverse current flow through the system. Additionally or alternatively, startup regulator 144 may include at least one set of back-to-back transistors connected between switch 148A and driver circuits 134H and 134L.

Switches 114H, 114L, 122L, 132H, and 132L may include any combination of N-type transistors and/or P-type transistors. Switches 114H, 114L, 122L, 132H, and 132L may comprise semiconductor material such as silicon, silicon carbide, and/or gallium nitride. Each of switches 114H, 114L, 122L, 132H, and 132L may include a freewheeling diode, an integrated body diode, and/or a backside diode. In some examples, each of switches 114H, 114L, 122L, 132H, and 132L may include a plurality of transistors connected in series and/or in parallel.

By delivering power to driver circuits 134H and/or 134L with a sufficiently high voltage level, postregulator 130 may be able to achieve a higher efficiency, as compared to a system where the voltage level delivered to the driver circuits is lower. For example, a high drive capability for driver circuits 134H and 134L may result in better on-resistance for switches 132H and 132L. In examples in which switch 132H is a P-type transistor, a high-voltage supply to driver circuit 134H may not be important because the control terminal of switch 132H is driven to a low voltage to activate switch 132H. The on-resistance of switch 132L may be more important than the on-resistance of switch 132H where the duty cycle of switch 132H is less than fifty percent because switch 132L will be activated more often than switch 132H. For similar reasons, the on-resistance of switches 112L, 122L, and 132L may be more important than the on-resistance of switches 112H and 132H. During a switching event for one of switches 112L, 112H, 122L, and 132L, the voltage level on rails 162 and 166 may decrease. During a decrease in voltage, buffer capacitor C2 in boost regulator 120 may smooth out the dip in voltage until boost regulator 120 can increase the voltage on rails 162 and 166 to a steady-state level.

An LDO IVCC device (e.g., LDO IVCC 240 shown in FIG. 2) may include selector circuit 142, startup regulator 144, and controller 146. As shown in FIG. 1, selector circuit 142 includes switch 148A connected between power source 180 and startup regulator 144. In examples in which controller 144 activates switch 148A and deactivates switch 148B, startup regulator 144 can deliver power from power source 180 and rail 160 to the driver circuits of preregulator 110 and postregulator 130 via rail 162. In examples in which controller 144 deactivates switch 148A and activates switch 148B, selector circuit 142 can deliver power from boost regulator 120 and rail 166 to the driver circuits of preregulator 110 and postregulator 130 via rail 162. In response to determining that boost regulator 120 is operational, controller 146 may be configured to deactivate switch 148A and activate switch 148B to deliver power from boost regulator 120 to the driver circuit of postregulator 130.

FIGS. 2-7 are conceptual block diagrams of an example system implementing a startup routine, in accordance with the techniques of this disclosure. Although the techniques of this disclosure are described in the context of a startup routine, some or all of these techniques may be used in other routines, such as normal operation, restart routines, and/or responding to a fault or other system condition. The techniques of this disclosure may be implemented in any system with a circuit (e.g., postregulator) that consumes power from a power source, especially a system where maintaining the supply voltage level on startup is a concern. For example, an automotive system or other electrical system with a single battery (e.g., twelve volts), two batteries in series (e.g., twenty-four volts), or a higher-voltage battery (e.g., forty-eight volts) may use the techniques described herein.

Figure 2:
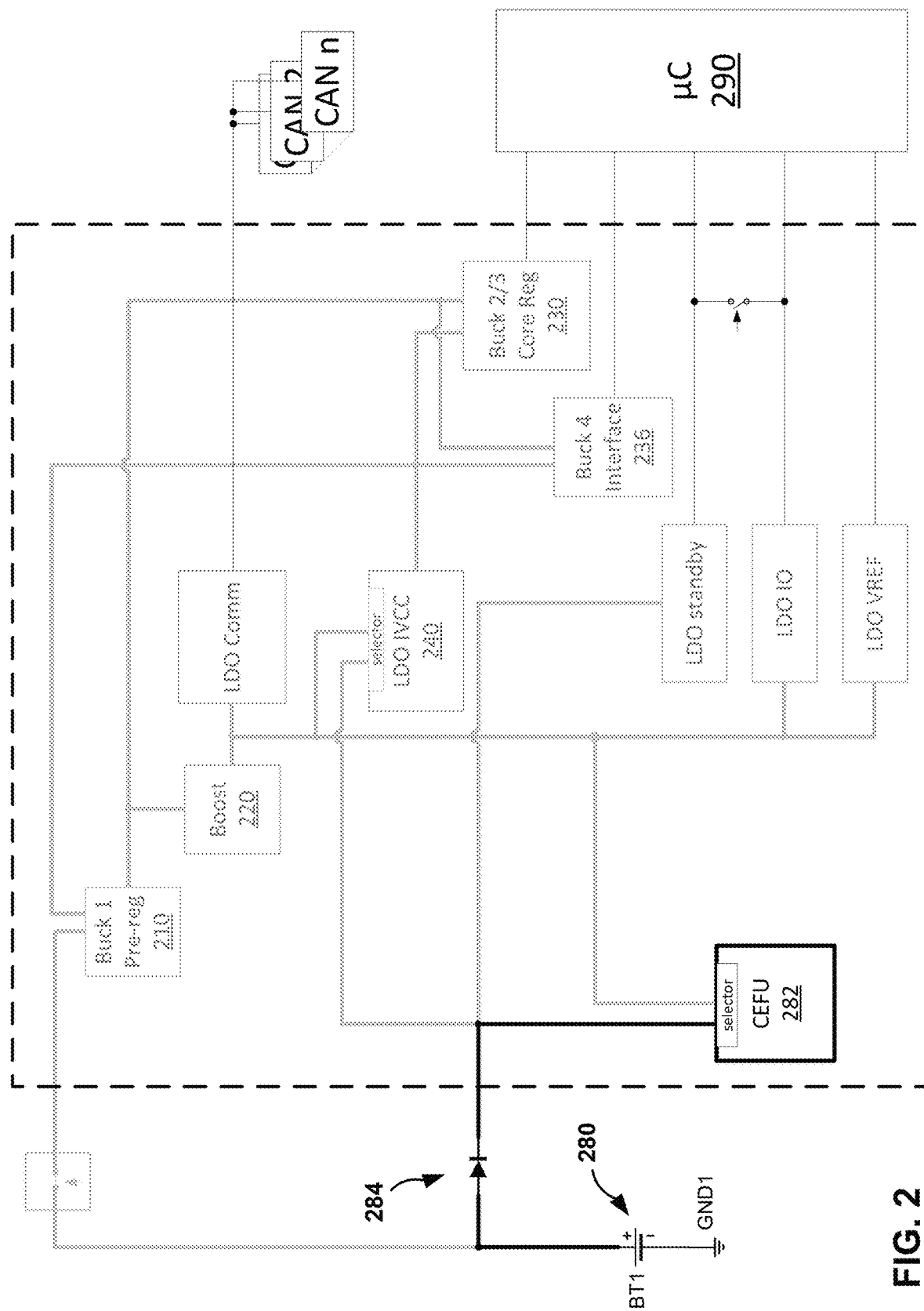
FIGS. 2-7 are conceptual block diagrams of an example system implementing a startup routine, in accordance with the techniques of this disclosure.
Figure 3:
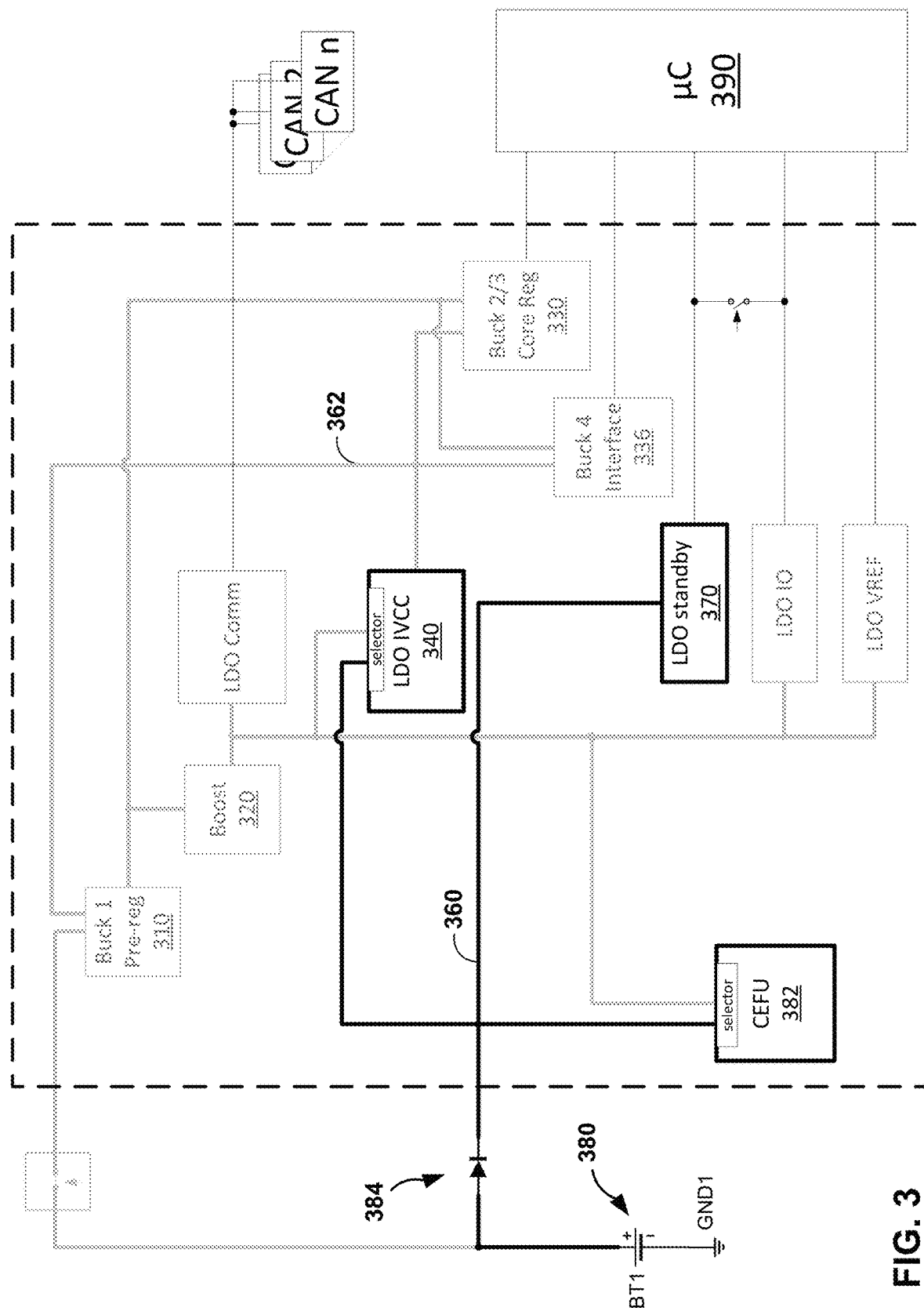

FIG. 2 shows an example of system operation in a first phase of a startup routine. Power source 280 may be configured to provide power to the central function circuit 282 through diode 284. FIG. 3 shows an example of system operation in another phase of a startup routine in which LDO internal supply of VCC (IVCC) 340 receives power from power source 380. LDO IVCC 340 and LDO standby 370 may be configured to receive power from power source 380 through diode 384 and via rail 360. LDO IVCC 340 and LDO standby 370 may be configured to provide the power for some or all of the driver circuits of the postregulators in the system.

Rail 360 may be configured to receive power from power source 380 via diode 384. In the example shown in FIG. 3, rail 360 is connected to central function circuit 382, LDO IVCC 340, and LDO standby 370. Rail 362 may be configured to receive power from LDO IVCC 340 and deliver power to preregulator 310 and postregulators 330 and 336 when LDO IVCC 340 is operational. Rail 362 may be connected to the driver circuits of one or more of regulators 310, 330, and 336.

Once LDO IVCC 330 receives power from power source 380 via rail 360, LDO IVCC 340 can deliver power to regulators 310, 330, and 336 via rail 362. In some examples, LDO IVCC 340 is configured to deliver power to the driver circuits of regulators 310, 330, and 336. For example, LDO IVCC 340 may include one or more power switches with channel(s) connected between rail 360 and a driver circuit of postregulator 330. Thus, a controller can activate the one or more switches of LDO IVCC 340 to deliver power from power source 380, through diode 384, through rail 360, and through LDO IVCC 340 to the driver circuits of regulators 310, 330, and 336.

Figure 4:
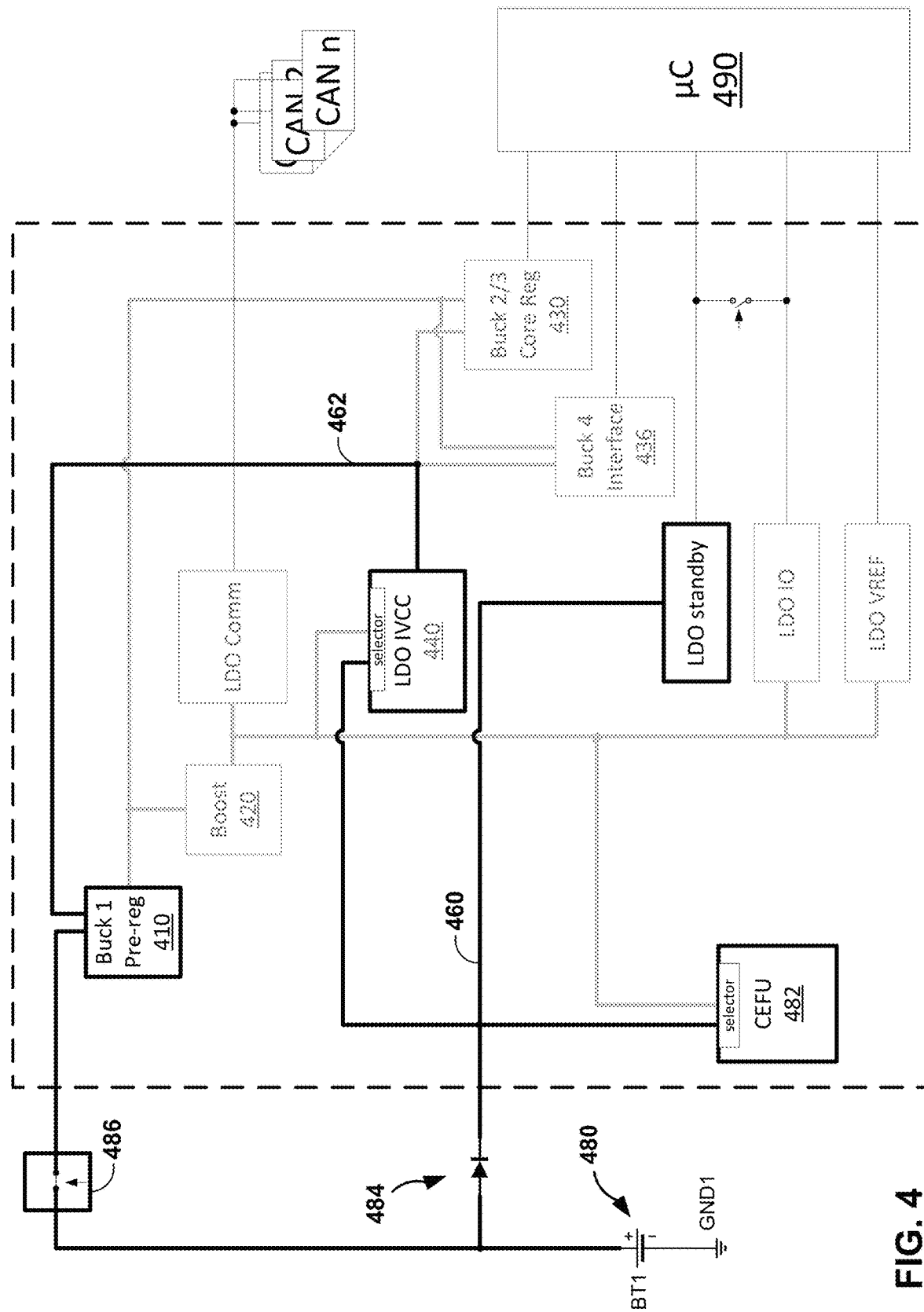

FIG. 4 shows an example of system operation in a phase of a startup routine in which preregulator 410 receives power from LDO IVCC 440 via rail 462 and from power source 480 via rail 460. As shown in FIG. 4, a driver circuit of preregulator 410 may be configured to receive power from LDO IVCC 440, and a channel of a power switch of preregulator 410 may receive power from power source 480 through switch 486. Power source 480 may supply power to the load path of preregulator 410, for example, to the channel of a power switch of preregulator 410. LDO IVCC 440 may supply power, via rail 462, to a driver circuit of preregulator 410, where the driver circuit of preregulator may be configured to activate and deactivate the power switch of preregulator 410.

A system controller such as a microprocessor, which is not shown in FIG. 4, may be configured to monitor a voltage level on rail 462. In response to determining that the voltage level on rail 462 has reached a sufficient voltage level, the system controller may be configured to activate safety switch 486 to supply power from power source 480 to preregulator 410. The system controller may be configured to also check for any faults in preregulator 410 and, if no faults are detected, the system controller may be configured to activate safety switch 486 so that preregulator 410 can receive power from power source 480. The system controller may be the same as, part of, or separate from the supply controller within LDO IVCC 340.

Figure 5:
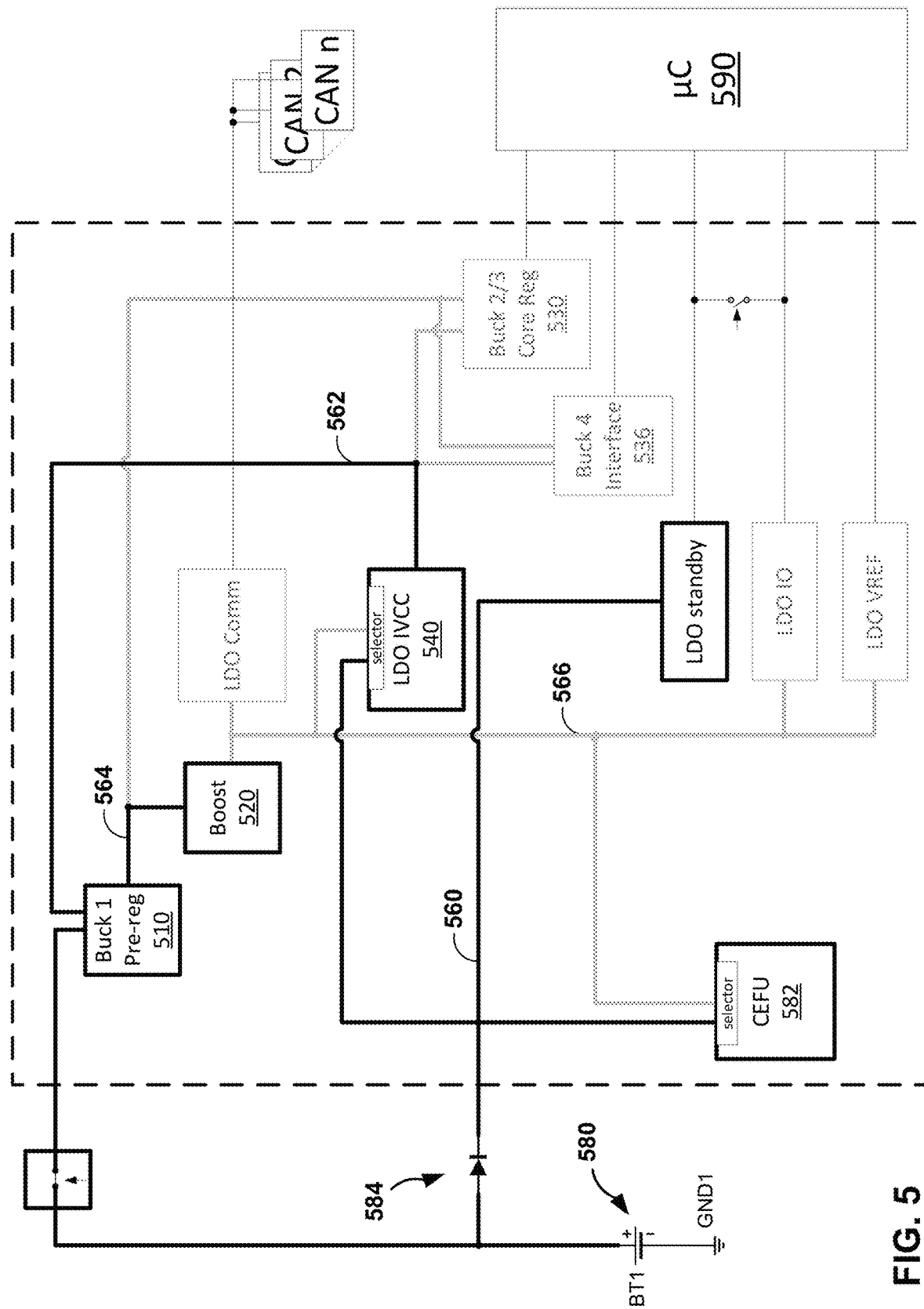

FIG. 5 shows an example of system operation in a phase of a startup routine in which preregulator 510 is operational. Preregulator 510 may be configured to generate power for rail 564, which is connected to boost regulator 520 and, in some examples, to postregulators 530 and 536. Rail 564 may be connected to the channels of power switches of regulators 520, 530, and 536. In some examples, rail 564 is configured to connect to the power switch of boost regulator 520 via an input inductance of boost regulator 520 (e.g., inductor 128 shown in FIG. 1).

A system controller may be configured to monitor the voltage level of rail 564. In response to determining that the voltage level of rail 564 has reached a sufficiently high level, the system controller may be configured to begin operating boost regulator 520. In examples in which boost regulator 520 is operational, boost regulator 520 may be configured to supply power to rail 566. At the beginning of the startup of boost regulator 520, the voltage level generated by boost regulator 520 may be less than the voltage level provided by the startup regulator in LDO IVCC 540.

Figure 6:
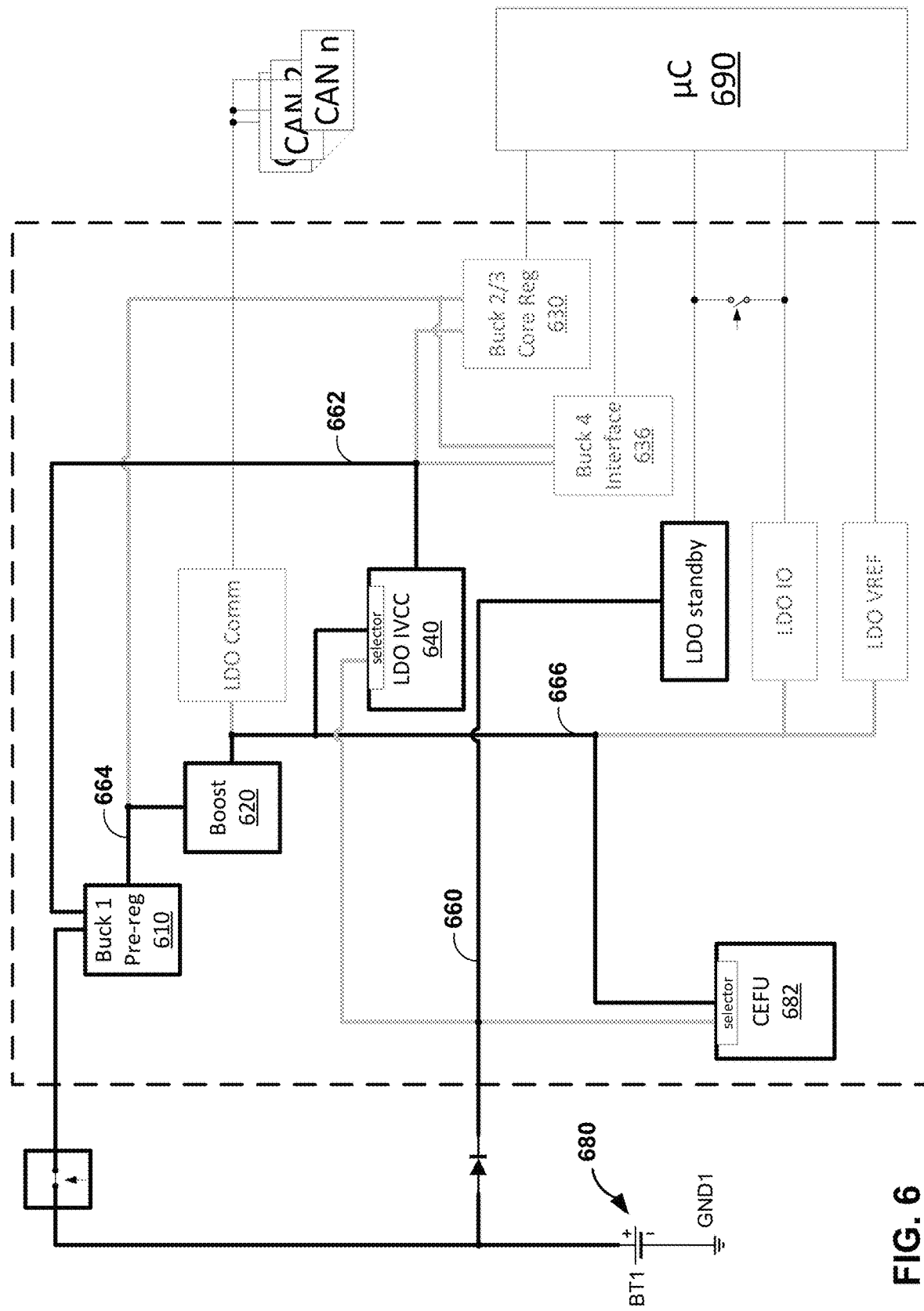

FIG. 6 shows an example of system operation in a phase of a startup routine in which boost regulator 620 is operational. LDO IVCC 640 may include a selector circuit, a startup regulator, and a controller. The selector circuit of LDO IVCC 640 may be configured to deliver power to the driver circuit(s) of one or more of regulators 610, 630, and 636. The startup regulator of LDO IVCC 640 may be configured to receive power from power source 680 and deliver a voltage signal to the driver circuit(s) of one or more of regulators 610, 630, and 636. The controller of LDO IVCC 640 may be configured to control the selector circuit to deliver power from either boost regulator 620 or the startup regulator of LDO IVCC 640 to the driver circuit(s) of one or more of regulators 610, 630, and 636.

To maximize the efficiency of the system, the selector circuit of LDO IVCC 640 and the selector circuit of central function circuit 682 may be configured to change the supply rail from power source 680 to boost regulator 620 when the voltage level on rail 666 is greater than a threshold level. The selector circuit of LDO IVCC 640 may include a power switch that, when delivering power from boost regulator 620 to postregulators 630 and 636, acts as a bypass switch to further improve the efficiency of the system.

The controller of LDO IVCC 640 may be configured to cause the selector circuit of LDO IVCC 640 to deliver power from power source 680 via rail 660 to postregulator 630 during, for example, the initial phase(s) of a startup routine. The controller of LDO IVCC 640 may be configured to then determine that boost regulator 620 is operational after causing the selector circuit to deliver power from power source 680 to postregulator 630. The controller of LDO IVCC 640 can determine that boost regulator 620 is operational by at least determining that the voltage level on rail 666 satisfies a threshold, e.g., that the voltage level on rail 666 is greater than or equal to a threshold level or within an acceptable range. In response to determining that boost regulator 620 is operational, the controller of LDO IVCC 640 may be configured to cause the selector circuit of LDO IVCC 640 to deliver power from boost regulator 620 and rail 666 to postregulator 630.

FIG. 7 shows an example of system operation in a phase of a startup routine in which the postregulators are operational. In the example shown in FIG. 7, rails 762, 764, and 766 are operational, and the supply controller in LDO IVCC 740 may be configured to implement a powerup scheme for shaping current jumps in preregulator 710 and for protecting a load connected to postregulator 730. LDO Standby 770 may be configured to receive power from LDO IO 772 once the supply voltage level for microcontroller 790 is greater than a threshold level. Postregulators 730 and 736 may take a relatively large amount of power from preregulator 710, and the output of postregulators 730 and 736 may be less than two volts.

In the example shown in FIG. 7, preregulator 710 may be configured to supply power to boost regulator 720 and postregulators 730 and 736 via rail 764. Boost regulator 720 may be configured to supply power to the driver circuits of postregulators 740, 770, 772, 774, and 776 via rail 766. LDO IVCC 740 may be configured to supply power from rail 766 to the driver circuits of preregulator 710 and postregulators 730 and 736 via rail 762. The switches of postregulators 730 and 736 may be configured to receive power from preregulator 710 via rail 764 and supply microcontroller 790 with low-voltage, high-current power, whereas postregulators 770, 772, and 774 may be configured to receive power from boost regulator 720 and supply microcontroller 790 with high-voltage, low-current power.

Figure 8:
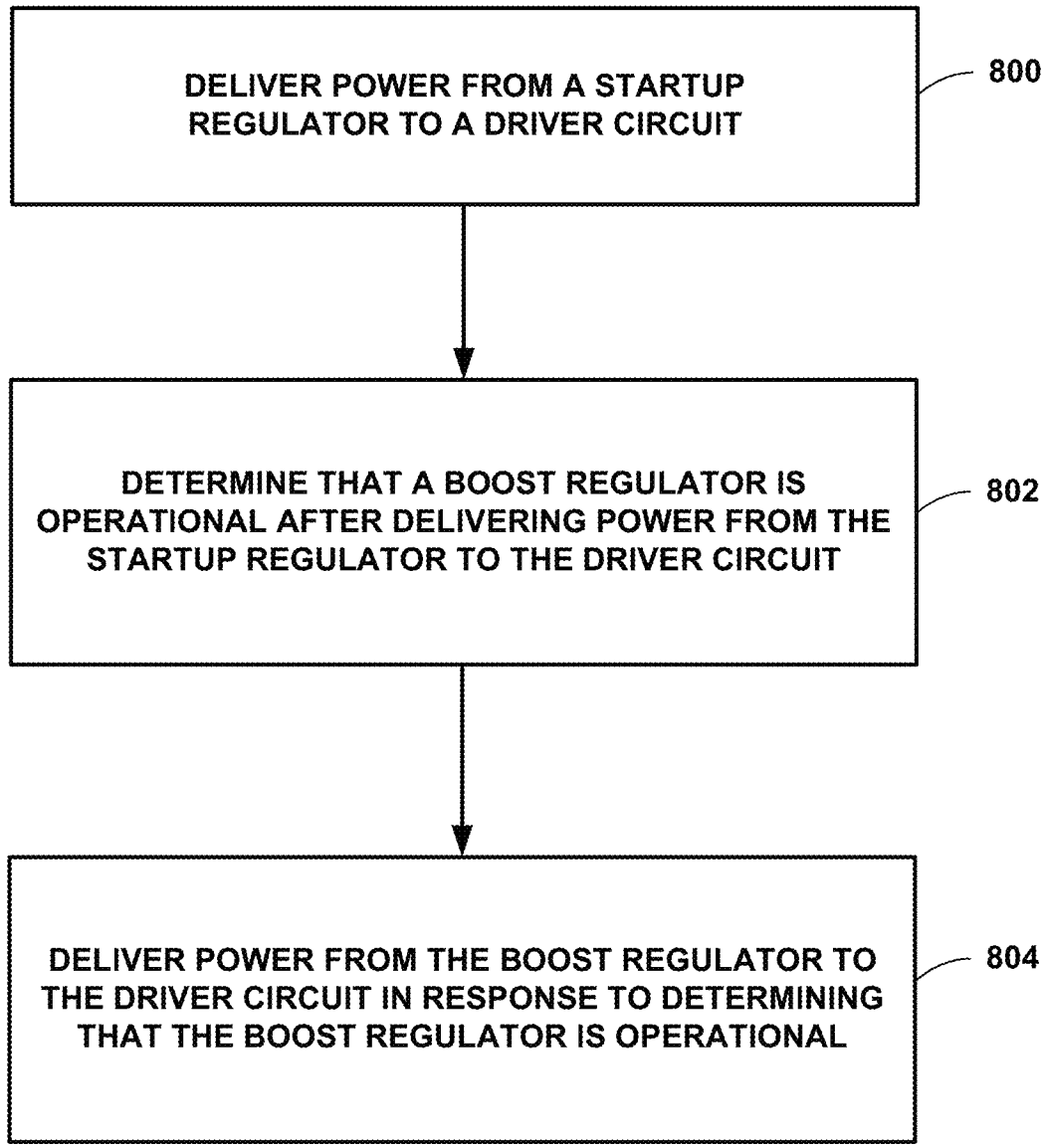
FIG. 8 is a flow diagram illustrating example techniques for delivering power to the driver circuit of a postregulator, in accordance with the techniques of this disclosure.

FIG. 8 is a flow diagram illustrating example techniques for delivering power to the driver circuit of a postregulator, in accordance with the techniques of this disclosure. The techniques of FIG. 8 are described with reference to selector circuit 142 and supply controller 146 shown in FIG. 1, although other components or devices may be used to perform similar techniques consistent with this disclosure.

In the example of FIG. 8, supply controller 146 causes selector circuit 142 to deliver power from startup regulator 144 to driver circuit 134H and/or 134L of postregulator 130 (800). Supply controller 146 may be configured to cause selector circuit 142 to deliver power from startup regulator 144 to driver circuit 134H and/or 134L by at least activating switch 148A and deactivating switch 148B. In addition, supply controller 146 may be configured to cause selector circuit 142 to deliver power from startup regulator 144 to driver circuit 114H and/or 114L of preregulator 110 by at least activating switch 148A and deactivating switch 148B.

In the example of FIG. 8, supply controller 146 determines that boost regulator 120 is operational after delivering power from startup regulator 144 to driver circuit 134H and/or 134L (802). Supply controller 146 may include a comparator configured to compare the voltage level of the output of boost regulator 120 to a threshold level or to the voltage level of the output of startup regulator 144. In response to determining that the voltage level of the output of boost regulator 120 is greater than or equal to the threshold level or the voltage level of the output of startup regulator 144, supply controller 146 may be configured to determine that boost regulator 120 is operational. Supply controller 146 may include a debouncing circuit or may be configured to perform a debouncing process to determine whether the voltage level of the output of boost regulator 120 satisfies a threshold for at least a predetermined period of time.

In the example of FIG. 8, supply controller 146 causes selector circuit 142 to deliver power from boost regulator 120 to driver circuit 134H and/or 134L in response to determining that boost regulator 120 is operational (804). Supply controller 146 may be configured to cause selector circuit 142 to deliver power from boost regulator 120 to driver circuit 134H and/or 134L by at least deactivating switch 148A and activating switch 148B. In addition, supply controller 146 may be configured to cause selector circuit 142 to deliver power from boost regulator 120 to driver circuit 114H and/or 114L of preregulator 110 by at least deactivating switch 148A and activating switch 148B.

Supply controller 146 may be configured to determine that a fault has occurred in boost regulator 120 by at least determining that an output voltage of boost regulator 120 is less than or equal to a threshold level. Additionally or alternatively, supply controller 146 may be configured to determine that a load impedance has increased (e.g., a load jump) by at least determining that the voltage on rail 162 or an output voltage of postregulator 130 is less than or equal to a threshold level. In response to determining that a fault occurred in boost regulator 120 or that a load jump occurred, supply controller 146 may be configured to cause selector circuit 142 to deliver power from startup regulator 144 to driver circuit 134H and/or 134L by at least activating switch 148A and deactivating switch 148B.

In some examples, supply controller 146 is configured to determine that the current drawn by driver circuits 134H and 134L is greater than or equal to a threshold level. Supply controller 146 can make this determination by determining whether the voltage level on rail 162 and/or 166 is less than or equal to a second threshold level. In response to determining that the current drawn by driver circuits 134H and 134L (or another load) is greater than or equal to the threshold level, supply controller 146 may be configured to cause selector circuit 142 to deliver power from startup regulator 144 to driver circuit 134H and/or 134L by at least activating switch 148A and deactivating switch 148B.

Boost regulator 120 may react more slowly to increases in current or decreases in voltage, as compared to startup regulator 144, so startup regulator 144 can step in to compensate for a quick change in current or voltage on rail

162. The slow reaction of boost regulator 120 may be due to the resistance to changes in current of inductor 128.

This disclosure has attributed functionality to controllers 116, 126, 136, and 146, each of which may include processing circuitry such as one or more processors. Controllers 116, 126, 136, and 146 may include any combination of integrated circuitry, discrete logic circuitry, analog circuitry, such as one or more microprocessors, digital signal processors (DSPs), application specific integrated circuits (ASICs), and/or field-programmable gate arrays (FPGAs). In some examples, controllers 116, 126, 136, and 146 may include multiple components, such as any combination of one or more microprocessors, one or more DSPs, one or more ASICs, or one or more FPGAs, as well as other discrete or integrated logic circuitry, and/or analog circuitry.

The techniques described in this disclosure may also be encoded in instructions and data stored to a non-transitory computer-readable storage medium, such as memory associated with controllers 116, 126, 136, and 146. The instructions may be executed by one or more processors (e.g., controllers 116, 126, 136, and 146). Example non-transitory computer-readable storage media may include RAM, ROM, programmable ROM (PROM), erasable programmable ROM (EPROM), electronically erasable programmable ROM (EEPROM), flash memory, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

The following numbered aspects demonstrate one or more clauses of the disclosure.

Clause 1. A method includes causing a selector circuit to deliver power from a startup regulator to a first driver circuit, where the first driver circuit is configured to activate and deactivate a first switch of a postregulator. The method also includes determining that a boost regulator is operational after delivering power from the startup regulator to the first driver circuit. The method further includes causing the selector circuit to deliver power from the boost regulator to the first driver circuit in response to determining that the boost regulator is operational.

Clause 2. The method of the preceding aspect, where causing the selector circuit to deliver power from the startup regulator to the first driver circuit includes activating a second switch in the selector circuit.

Clause 3. The method of the preceding aspects or any combination thereof, where causing the selector circuit to deliver power from the boost regulator to the first driver circuit includes deactivating a second switch in response to determining that the boost regulator is operational.

Clause 4. The method of the preceding aspects or any combination thereof, where the second switch is connected between a power source and the startup regulator.

Clause 5. The method of the preceding aspects or any combination thereof, where causing the selector circuit to deliver power from the startup regulator to the first driver circuit includes deactivating a third switch in the selector circuit.

Clause 6. The method of the preceding aspects or any combination thereof, where causing the selector circuit to deliver power from the boost regulator to the first driver circuit includes activating a third switch in response to determining that the boost regulator is operational.

Clause 7. The method of the preceding aspects or any combination thereof, where the third switch is connected between the boost regulator and the first driver circuit.

Clause 8. The method of the preceding aspects or any combination thereof, further including causing the selector circuit to deliver power from the startup regulator to a second driver circuit, where the second driver circuit is configured to activate and deactivate a second switch of a preregulator, where the preregulator delivers power to the first switch of the postregulator.

Clause 9. The method of the preceding aspects or any combination thereof, further including causing the selector circuit to deliver power from the boost regulator to the second driver circuit in response to determining that the boost regulator is operational.

Clause 10. The method of the preceding aspects or any combination thereof, further including determining that a fault occurred in the boost regulator after causing the selector circuit to deliver power from the boost regulator to the first driver circuit.

Clause 11. The method of the preceding aspects or any combination thereof, further including causing the selector circuit to deliver power from the startup regulator to the first driver circuit in response to determining that the fault occurred in the boost regulator.

Clause 12. The method of the preceding aspects or any combination thereof, further including determining that a current drawn by the first driver circuit is greater than or equal to a threshold level after causing the selector circuit to deliver power from the boost regulator to the first driver circuit.

Clause 13. The method of the preceding aspects or any combination thereof, further including causing the selector circuit to deliver power from the startup regulator to the first driver circuit in response to determining that the current drawn by the first driver circuit is greater than or equal to the threshold level.

Clause 14. The method of the preceding aspects or any combination thereof, further including determining that a load jump occurred after causing the selector circuit to deliver power from the boost regulator to the first driver circuit.

Clause 15. The method of the preceding aspects or any combination thereof, further including causing the selector circuit to deliver power from the startup regulator to the first driver circuit in response to determining that the load jump occurred.

Clause 16. The method of the preceding aspects or any combination thereof, where the first switch includes an N-type metal-oxide-semiconductor transistor.

Clause 17. A device includes a selector circuit configured to deliver power to a first driver circuit, where the first driver circuit is configured to activate and deactivate a first switch of a postregulator. The device also includes a startup regulator and a controller configured to cause the selector circuit to deliver power from the startup regulator to the first driver circuit. The controller is also configured to determine that a boost regulator is operational after delivering power from the startup regulator to the first driver circuit. The controller is further configured to cause the selector circuit to deliver power from the boost regulator to the first driver circuit in response to determining that the boost regulator is operational.

Clause 18. The device of the preceding aspect, where the controller is configured to perform the method of the preceding aspects or any combination thereof.

Clause 19. A system includes a boost regulator and a postregulator including a first switch configured to deliver power to a load and a first driver circuit configured to activate and deactivate the first switch. The system also includes a selector circuit configured to deliver power to the first driver circuit and a controller configured to cause the selector circuit to deliver power from a startup regulator to the first driver circuit. The controller is also configured to determine that the boost regulator is operational after delivering power from the startup regulator to the first driver circuit. The controller is further configured to cause the selector circuit to deliver power from the boost regulator to the first driver circuit in response to determining that the boost regulator is operational.

Clause 20. The system of the preceding aspect, where the controller is configured to perform the method of the preceding aspects or any combination thereof.

Clause 21. The system of the preceding aspects or any combination thereof, further including a preregulator including an additional switch configured to deliver power to the first switch and a second driver circuit configured to activate the additional switch.

Clause 22. The system of the preceding aspects or any combination thereof, where the controller is configured to cause the selector circuit to deliver power from the startup regulator to a second driver circuit of a preregulator.

Clause 23. The system of the preceding aspects or any combination thereof, where the controller is configured to cause the selector circuit to deliver power from the boost regulator to a second driver circuit of a preregulator in response to determining that the boost regulator is operational.

Clause 24. The system of the preceding aspects or any combination thereof, where the first switch includes an N-type metal-oxide-semiconductor transistor.

Clause 25. The system of the preceding aspects or any combination thereof, further including a first voltage rail, where the boost regulator is configured to deliver power to the postregulator via the first voltage rail, and where the startup regulator is configured to deliver power to the postregulator via the first voltage rail.

Clause 26. The system of the preceding aspects or any combination thereof, further including a second voltage rail, where a preregulator is configured to deliver power to the boost regulator and to the first switch via the second voltage rail.

Clause 27. A system including means for performing the method of the preceding aspects or any combination thereof.

Clause 28. A device including a computer-readable medium having executable instructions stored thereon, configured to be executable by processing circuitry for causing the processing circuitry to perform the method of the preceding aspects or any combination thereof.

Various examples of the disclosure have been described. Any combination of the described systems, operations, or functions is contemplated. These and other examples are within the scope of the following claims.

What is claimed is:

1. A device comprising:
    a selector circuit configured to deliver power to a first driver circuit, wherein the first driver circuit is configured to activate and deactivate a first switch of a postregulator;
    a startup regulator; and
    a controller configured to:
        cause the selector circuit to deliver power from the startup regulator to the first driver circuit;
        determine that a boost regulator is operational after delivering power from the startup regulator to the first driver circuit; and
        cause the selector circuit to deliver power from the boost regulator to the first driver circuit in response to determining that the boost regulator is operational.

2. The device of claim 1,
    wherein the selector circuit comprises a second switch,
    wherein to cause the selector circuit to deliver power from the startup regulator to the first driver circuit, the controller is configured to activate the second switch, and
    wherein to cause the selector circuit to deliver power from the boost regulator to the first driver circuit, the controller is configured to deactivate the second switch.

3. The device of claim 2, wherein the second switch is connected between a power source and the startup regulator.

4. The device of claim 2,
    wherein the selector circuit further comprises a third switch,
    wherein to cause the selector circuit to deliver power from the startup regulator to the first driver circuit, the controller is configured to deactivate the third switch, and
    wherein to cause the selector circuit to deliver power from the boost regulator to the first driver circuit, the controller is configured to activate the third switch.

5. The device of claim 4, wherein the third switch is connected between the boost regulator and the first driver circuit.

6. The device of claim 1, wherein the controller is further configured to:
    cause the selector circuit to deliver power from the startup regulator to a second driver circuit, wherein the second driver circuit is configured to activate and deactivate an additional switch of a preregulator, and wherein the preregulator delivers power to the first switch; and
    cause the selector circuit to deliver power from the boost regulator to the second driver circuit in response to determining that the boost regulator is operational.

7. The device of claim 1, wherein the controller is further configured to:
    determine that a fault occurred in the boost regulator after causing the selector circuit to deliver power from the boost regulator to the first driver circuit; and
    cause the selector circuit to deliver power from the startup regulator to the first driver circuit in response to determining that the fault occurred in the boost regulator.

8. The device of claim 1, wherein the controller is further configured to:
    determine that a current drawn by the first driver circuit is greater than or equal to a threshold level after causing the selector circuit to deliver power from the boost regulator to the first driver circuit; and
    cause the selector circuit to deliver power from the startup regulator to the first driver circuit in response to determining that the current drawn by the first driver circuit is greater than or equal to the threshold level.

9. A system comprising:
    a boost regulator;
    a postregulator comprising:
        a first switch configured to deliver power to a load; and
        a first driver circuit configured to activate and deactivate the first switch;

a selector circuit configured to deliver power to the first driver circuit; and a controller configured to:
- cause the selector circuit to deliver power from a startup regulator to the first driver circuit;
- determine that the boost regulator is operational after delivering power from the startup regulator to the first driver circuit; and
- cause the selector circuit to deliver power from the boost regulator to the first driver circuit in response to determining that the boost regulator is operational.

10. The system of claim 9, further comprising a preregulator circuit including:
- an additional switch configured to deliver power to the first switch; and
- a second driver circuit configured to activate the additional switch; and
- wherein the controller is configured to:
  - cause the selector circuit to deliver power from the startup regulator to the second driver circuit; and
  - cause the selector circuit to deliver power from the boost regulator to the second driver circuit in response to determining that the boost regulator is operational.

11. The system of claim 10,
- wherein the additional switch is configured to receive power from a power source, and
- wherein the startup regulator is configured to receive power from a power source via the selector circuit.

12. The system of claim 9, wherein the selector circuit comprises a second switch,
- wherein to cause the selector circuit to deliver power from the startup regulator to the first driver circuit, the controller is configured to activate the second switch, and
- wherein to cause the selector circuit to deliver power from the boost regulator to the first driver circuit, the controller is configured to deactivate the second switch.

13. The system of claim 12, wherein the second switch is connected between a power source and the startup regulator.

14. The system of claim 12,
- wherein the selector circuit further comprises a third switch,
- wherein to cause the selector circuit to deliver power from the startup regulator to the first driver circuit, the controller is configured to deactivate the third switch, and
- wherein to cause the selector circuit to deliver power from the boost regulator to the first driver circuit, the controller is configured to activate the third switch.

15. The system of claim 14, wherein the third switch is connected between the boost regulator and the first driver circuit.

16. The system of claim 9, wherein the controller is further configured to:
- determine that a fault occurred in the boost regulator after causing the selector circuit to deliver power from the boost regulator to the first driver circuit; and
- cause the selector circuit to deliver power from the startup regulator to the first driver circuit in response to determining that the fault occurred in the boost regulator.

17. The system of claim 9, wherein the controller is further configured to:
- determine that a current drawn by the first driver circuit is greater than or equal to a threshold level after causing the selector circuit to deliver power from the boost regulator to the first driver circuit; and
- cause the selector circuit to deliver power from the startup regulator to the first driver circuit in response to determining that the current drawn by the first driver circuit is greater than or equal to the threshold level.

18. The system of claim 9, wherein the first switch comprises an N-type metal-oxide-semiconductor transistor.

19. A method comprising:
- causing a selector circuit to deliver power from a startup regulator to a first driver circuit, wherein the first driver circuit is configured to activate and deactivate a first switch of a postregulator;
- determining that a boost regulator is operational after delivering power from the startup regulator to the first driver circuit; and
- causing the selector circuit to deliver power from the boost regulator to the first driver circuit in response to determining that the boost regulator is operational.

20. The method of claim 19,
- wherein causing the selector circuit to deliver power from the startup regulator to the first driver circuit comprises activating a second switch in the selector circuit and deactivating a third switch in the selector circuit, and
- wherein causing the selector circuit to deliver power from the boost regulator to the first driver circuit comprises deactivating the second switch and activating the third switch in response to determining that the boost regulator is operational.

* * * * *